Figure 1:
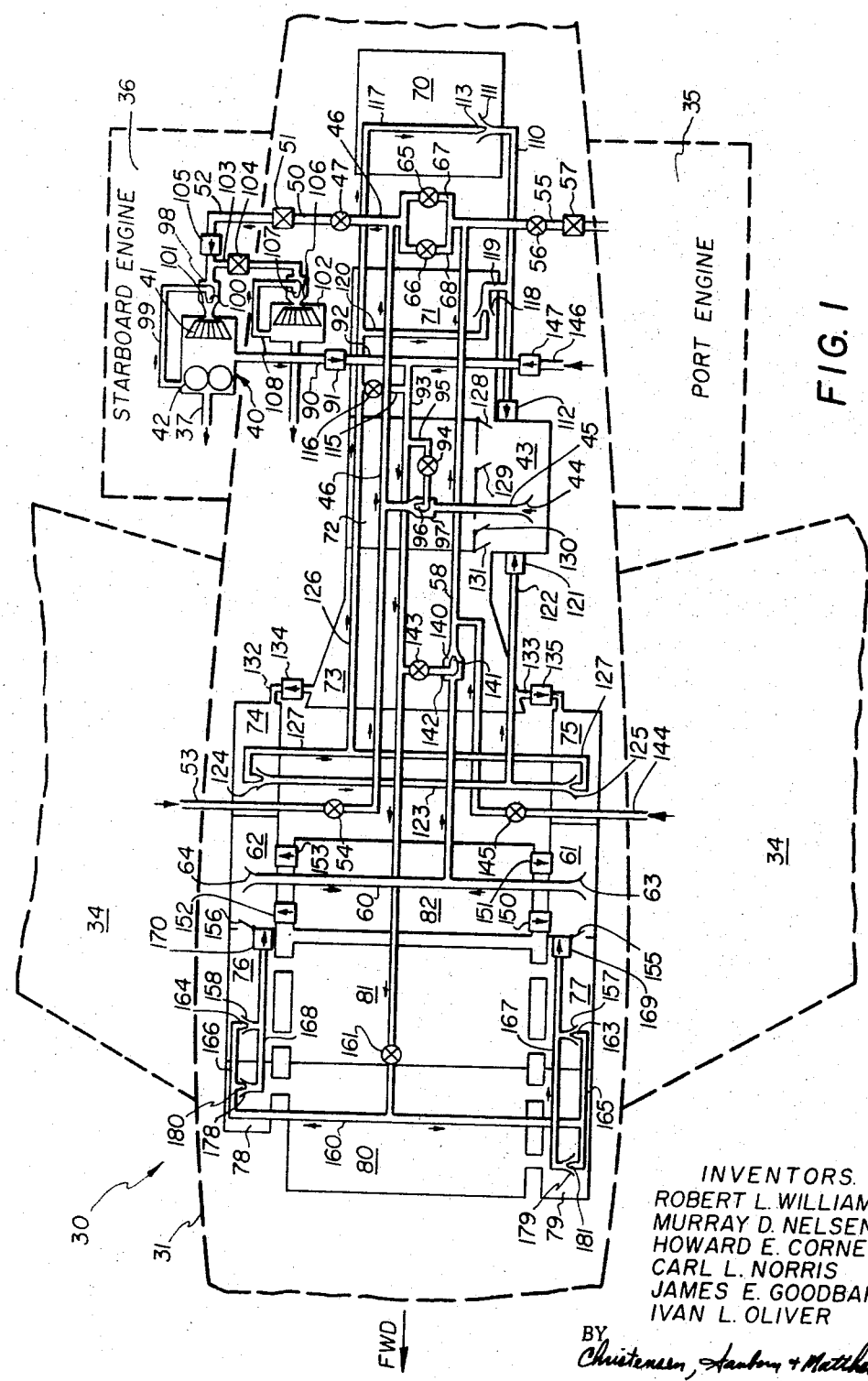

INVENTORS.
ROBERT L. WILLIAMS
MURRAY D. NELSEN
HOWARD E. CORNER
CARL L. NORRIS
JAMES E. GOODBAR
IVAN L. OLIVER

BY
Christensen, Sanborn, & Matthews
ATTORNEYS

United States Patent Office 3,319,570
Patented May 16, 1967

3,319,570
FUEL FEEDING SYSTEMS
Carl L. Norris, Huntsville, Ala., Robert L. Williams, Murray D. Nelsen, and Howard E. Corner, Wichita, Kans., James E. Goodbar, Huntsville, Ala., and Ivan L. Oliver, New Orleans, La., assignors to The Boeing Company, Seattle, Wash., a corporation of Delaware
Original application Jan. 2, 1964, Ser. No. 335,236. Divided and this application Dec. 14, 1965, Ser. No. 528,013
4 Claims. (Cl. 103—5)

This is a divisional application of copending parent U.S. patent application Serial Number 335,236, filed January 2, 1964, for "Fuel Feeding Systems."

This invention relates to fuel feeding systems, and more particularly relates to fuel feeding systems for aircraft.

Conventional aircraft fuel feeding systems have heretofore utilized one or more centrifugal boost pumps located within fuel tank means in an aircraft. The centrifugal boost pumps supply fuel to aircraft engine driven fuel pump means.

An engine driven fuel pump usually has two stages, the first stage being of a centrifugal type and the second stage being of a positive displacement type. The tank mounted boost pump is required to prevent engine pump failure due to cavitation at altitude. The fuel boost pump must be sized to maintain required positive pressure at the engine driven pump inlet during all flight conditions of the aircraft and for all engine throttle settings.

An impeller of a centrifugal pump, such as is usually used as a tank mounted fuel boost pump, is characterized by high impeller tip speeds. High impeller tip speeds cause localized areas of low static pressure which can become so low as to permit the vaporization of a liquid, such as highly volatile jet fuel. This vaporization phase causes fluctuations in pump performance and reduces fuel output pressure. This phenomenon is usually termed cavitation. If pump cavitation is to be prevented due to high fuel temperature and/or high altitudes, some form of tank pressurization must be employed and/or additional power is required for driving the pump. Accordingly, there is a deterioration of boost pump performance with an increase in fuel temperature and/or altitude.

Most large or high performance aircraft presently use centrifugal pumping systems for engine fuel feed and transfer purposes. A principal type of centrifugal pumping system employs electrical motor driven pumps powered with electricity from a constant speed alternator. Other systems utilize hydraulic and pneumatic turbine driven pumps. These systems have a history of malfunctioning and excessive maintenance and therefore cannot achieve a high degree of mission reliability. Accordingly, aircraft utilizing these systems must have dual systems. This often results in use of a combination of different types of centrifugal pumping systems, which require an excessive amount of secondary power.

This invention contemplates the use of ejector pumps in a fuel feeding system for reducing the number of moving parts by the elimination of centrifugal boost pumps, and thereby providing a major improvement in aircraft fuel feeding systems.

This invention further contemplates the use of available fuel from an engine driven pump to drive engine feed and auxiliary tank ejectors. The invention eliminates the tank mounted centrifugal fuel boost pumps through utilization of power available from engine driven fuel pump means.

It is an object of this invention therefore, to provide novel aircraft fuel feeding systems employing ejector pumps and thereby reducing the number of moving parts through the use of ejector pumps for fuel boost and/or transfer purposes. Ejector pumps do not have moving parts that wear out nor do they have lubrication or overheat problems generally associated with a centrifugal type pump and therefore do not require the maintenance procedures associated with centrifugal pumps. The ejector pumps require no wiring, cockpit controls, or circuit breakers, and accordingly eliminate the usual fire hazards associated with electrical boost pumps.

Another object of this invention is the provision of a novel aircraft fuel feeding system employing ejector boost pumps that are simple and reliable. Since an ejector boost pump depends upon an engine driven pump for operation and the engine also depends on the engine driven pump for operation there is no necessity for an auxiliary electrical system for driving a centrifugal boost pump from an external power supply. This lends simplicity and reliability to the invention.

Another object of this invention is the provision of a novel aircraft fuel feeding system utilizing ejector boost pumps positioned in such a manner as to make a maximum amount of fuel in the tanks available for use. Generally, a centrifugal boost pump cannot, at rated performance, pump the last several inches of fuel in a tank mounted installation thereof.

Yet another object of this invention is the provision of a novel fuel feeding system utilizing ejector fuel pumps in such a manner that ejector pump performance increases with altitude since fuel flow required by an engine is reduced by an increase in altitude, and accordingly more fuel is made available as primary flow for operating the ejector boost pumps. In contradistinction thereto the outputs of centrifugal boost pumps decay with altitude because ambient pressure is reduced with an increase in altitude. Accordingly, the fuel boost pressure rises required by the engine pump become greater in order to sustain the minimum pump inlet pressure of the centrifugal boost pump. Normally the fuel required by an engine driven pump for supplying fuel to an engine is essentially constant for a given engine speed regardless of altitude. Thus at an altitude where the engine demands less fuel flow, the excess power necessary for pumping is converted into heat. In a system utilizing ejector boost pumps this power is used for pumping and therefore is not completely converted into heat. However, this excess power is not utilized in a centrifugal boost pump system. Also additional power is required for the centrifugal boost pumps. The ejector system therefore is more efficient since no additional power is required for boost. The ejector system is less costly because of its simplicity. Moreover, there is a saving of weight.

Another object of this invention is the provision of a novel aircraft fuel feeding system, utilizing ejector pumps for engine fuel feeding and intertank transfer purposes, having many advantages over conventional centrifugal type boost pumping systems through the reduction of maintenance, secondary power requirements, weight, or cost, and/or by improved reliability and safety.

Figure 2:
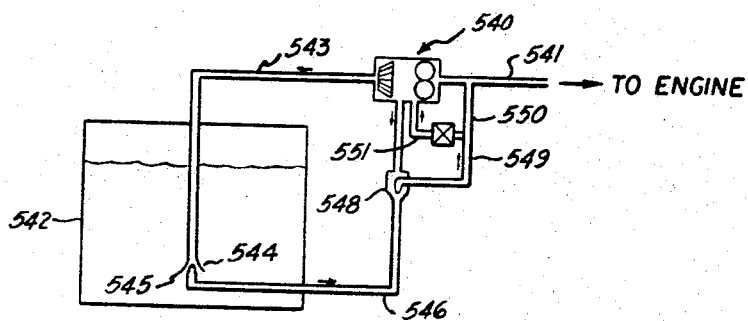
Figure 3:
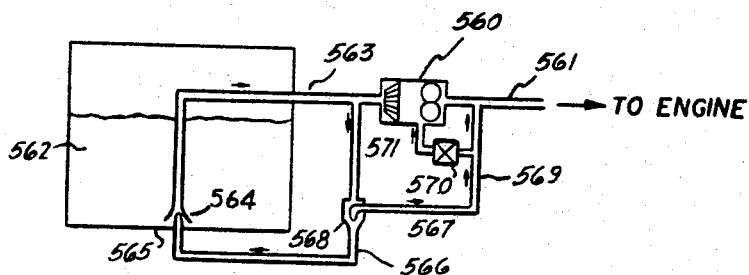

The invention further resides in certain novel features of construction, combinations, and arrangements of parts, and further objects and advantages of the invention will be apparent to those skilled in the art to which it pertains from the following description of the present preferred embodiments thereof described with reference to the accompanying drawings, which form a part of this specification, wherein the same reference numerals indicate corresponding parts throughout the several views, and in which:

FIG. 1 is a schematic diagram in plan view of a fuel storage, transfer, and feeding system for a high performance aircraft preferably having two engines with afterburners and embodying the invention; and FIG. 2 and 3 are schematic diagrams of fuel feeding subsystems of the present invention.

It is to be understood that the invention is not limited to the details of construction and the arrangements of parts shown in the drawings and hereinafter described in detail, but is capable of being otherwise embodied and of being practiced and carried out in various ways. It is to be further understood that the terminology employed herein is for the purpose of description and there is no intention to herein limit the invention beyond the requirements of the prior art.

Referring to FIG. 1, an aircraft indicated generally by the reference numeral 30 comprises a fuselage 31, variable swept wings 34, and an empennage, not shown. In its preferred form, the invention provides new fuel transfer and feeding systems and includes subsystem modifications embodying the invention suited for use on an aircraft having one or more engines. The aircraft 30 is shown with two engines 35 and 36. However, the subsystems will be described in relation to the starboard engine 36 only, since the subsystems for the port engine 35 may be considered substantially the same.

Referring to the engine 36, fuel is pumped to burners therein, not shown, through a fuel line 37 by means of a two-stage pump, indicated generally by the reference numeral 40. The pump 40 has a centrifugal pump first stage 41 and a positive displacement gear pump second stage 42. The pump 40 draws fuel from a main sump 43 via an intake eductor 44, a main branch line 45, a line 46, through a fire shutoff valve 47 in a line 50, a shutoff valve 51 in a line 52 to the intake side of the centrifugal first stage pump 41. The line 46 is also connected via a line 53 to conduct fuel from the starboard wing 34. The line 53 has a motor operated, manual override valve 54 therein. A two-stage pump, similar to the pump 40 and which is not shown, is attached to a line 55 having a fire shutoff valve 56 therein and a motor operated, manual override valve 57 therein. Primarily, the port engine 35 draws fuel via the line 55, a main feed line 58, a cross feed line 60, from a port sump 61 and a starboard sump 62. The opposite ends of the line 60 have eductors 63 and 64 attached thereto.

It is to be understood that the eductors 44, 63, and 64 are preferably disposed closely facing parallel to the bottom of each of the sumps 43, 61, and 62 respectively. However, the eductors 44, 63, 64 are roughly schematically illustrated as located in their respective sump tanks without any particular orientation being precisely illustrated since such orientation can be varied as desired. One of the advantages of using eductors 44, 63 and 64 in this manner is that most of the fuel can be drawn from the sumps 43, 61, and 62, respectively, during normal flight attitude and thus reduce fire hazard. This also provides greater economy of operation of the aircraft with all the attendant advantages thereof.

The lines 55 and 50 have parallel cross feed valves 65 and 66 in interconnecting parallel lines 67 and 68 respectively, for permitting the desired cross feed of fuel between the main supply lines 46 and 58 to the two engines 36 and 35, respectively. In addition to the main fuel tanks in the wings 34 and the fuselage sumps 43, 61, 62, additional tanks 70, 71, 72, 73, 74, 75, 76, 77, 78, 79, 80, 81 and 82 are provided.

An ejector pump nozzle feedback line 90 is connected to the first stage 41 of the two-stage pump 40 and conducts fuel under pressure therethrough via a check valve 91, a line 92, a main line 93, and a motor operated, manual override valve 94 in a branch line 95, to an ejector 96 of an ejector pump 97 in the main branch line 45. The ejector pump 97 boosts the pressure in the main fuel line 46 that leads to the pump 40.

Referring to the engine 36 in FIG. 1, an additional boost in pressure is provided to relieve the pump 40 by a feedback to an ejector pump 98 in the line 52. The pump 98 is adjacent to or at the intake side of the first stage 41 of the pump 40. Fuel is fed from the discharge side of the positive displacement second stage 42 of the pump 40 via a line 99 to a nozzle 100 of the ejector pump 98. The pump 98 has an eductor 101 in the line 52. The two ejector pumps 97 and 98 are lightweight in construction and eliminate the necessity for electrically driven auxiliary boost pumps in the fuel tanks, and efficiently utilize excess displacement and power of the two-stage pump 40.

A single stage centrifugal afterburner pump 102 has an intake part thereof connected via a line 103 to the line 52 for supplying fuel to an afterburner, not shown, of the engine 36. Preferably a shutoff valve 104 is located in line 103, also a one-way check valve 105 is located in the line 52 immediately up-stream of the connection of the line 103 with the line 52. Preferably the line 103 is connected up-stream of the ejector pump 98 in the embodiment of FIG. 1. Fuel is supplied through the line 103 to the afterburner pump 102 and is boosted along by an ejector pump having an eductor 106 connected into the line 103 adjacent to the pump 102. An ejector pump nozzle 107 is operatively disposed in the eductor 106 and is supplied with fuel under pressure from the pump 102 via a feedback line 108.

Due to the inherent instability and imbalance problem caused by a shift in the center of gravity of a variable sweep wing aircraft and also in view of the well known fuel sloshing problem in a high performance type military fuel aircraft, it is necessary to have a large number of fuel tanks, both in the wings and in the fuselage. The fuel tanks may be referred to as separate and distinct or discrete tanks, sump tanks, and transfer tanks. However it is to be understood that these tanks can be combined or baffled and otherwise varied generally in accordance with the state-of-the-art. For example, fuel is pumped from the auxiliary tank 70 located in the aft portion of the fuselage 31 via a transfer line 110 having an eductor 111 at the intake end thereof in the tank 70 and having the other end thereof supplying fuel to the main sump 43 via a one-way check valve 112 at the discharge end of the line 110.

An ejector nozzle 113 has its discharge end in operative arrangement with the eductor 111 for forming an ejector pump within the fuel tank 70. The main feedback line 90 supplies fuel under pressure to the nozzle 113 of the ejector pump via the check valve 91, the line 92, a cross feed line 115 having a motor operated, manual override valve 116 therein, and a feedback line 117.

The transfer line 110 has the fuel pressure therein boosted by means of an auxiliary ejector pump 118 in the auxiliary fuel tank 71. The ejector pump 118 comprises an eductor with a nozzle therein. The intake end of a line 119 is connected to the eductor of the pump 118 and feeds fuel to the transfer line 110. The nozzle of the pump 118 is connected to a line 120. The line 120 is connected to the feedback line 117 between the nozzle 113 in the tank 70 and the cross feed line 115 in the tank 71.

Fuel is also pumped into the main sump tank 43 by way of a check valve 121 in a fuel transfer line 122 connected to a cross feed line 123 for drawing fuel from the auxiliary tanks 74 and 75. The tanks 74 and 75 are respectively located in the starboard and port sides of the fuselage 31 near the trailing roots of the wings 34. The cross feed line 123 has ejector pumps 124 and 125 at the opposite ends thereof in the tanks 74 and 75 respectively. The nozzles of the ejector pumps 124 and 125 are supplied with fuel under pressure from the feedback lines 90, 92, 115 and then via a feedback line 126 and across feed feedback line 127.

Auxiliary tanks 71, 72 and 73 dump fuel into the sump 43 by means of flap valves 128, 129 and 130, and 131, respectively. Additionally the auxiliary tank 73 continuously replenishes fuel in the auxiliary sump tanks 74 and 75 via lines 132, 133 having check valves 134 and 135 therein, respectively. The check valves 134 and 135 prevent the reverse flow of fuel from auxiliary sump tanks 74 and 75 into the auxiliary tank 73.

The auxiliary sump tanks 61 and 62 supply fuel respectively via eductors 63 and 64 through the cross feed line 60 and the main port engine fuel feed line 58 to the port engine 35 via the line 55, the pump 40, and the line 57; or simultaneously therewith via the cross feed lines 67, 68 and the lines 50 and 52 to the pump 40 of the starboard engine 36.

The pressure in the main port side feed line 58 is preferably boosted by means of an ejector pump 140 therein from the main feedback line 93. The ejector pump 140 has a nozzle 141 therein receiving feedback fuel from the main feedback line 93 via a branch feedback line 142 having a motor operated, manual override valve 143 therein. The main port side line 58 also draws fuel from the port wing via a lead line 144 having a motor operated, manual override valve 145 therein. The line 144 is connected to the line 58 downstream of the ejector pump 140. The port engine 35 assists the starboard engine 36 in supplying feedback line pressure to the main feedback line 93 via a line 146 having a one-way check valve 147 therein.

The sumps 61 and 62, from which the port side engine 35 chiefly draws its fuel, are continuously supplied from the auxiliary tank 82 respectively via one-way check valves 150, 151, and 152, 153.

Although the sumps 61 and 62 are additionally supplied with fuel from the tanks 77 and 76, respectively, via dump valves 155 and 156, provision is made for pumping fuel thereto by means of ejector pumps 157 and 158 located in the tanks 77 and 76, respectively. The main pressure feedback line 93 is connected to a cross feed line 160 as controlled by a motor operated, manual override valve 161 located in the line 93. Ejector nozzles 163 and 164 of the pumps 157 and 158 are connected to the opposite ends of the cross feed line 160 via lines 165 and 166, respectively. The pumps 157 and 158 respectively discharge through lines 167 and 168 and one-way check valves 169 and 170 into the sump tanks 61 and 62.

The auxiliary tanks 76 and 77 have common connections with the larger auxiliary tank 81. Similarly the auxiliary tanks 78 and 79 have common connections with the larger auxiliary tank 80. Fuel in the tanks 78 and 79 is transferred to the sump tanks 62 and 61, respectively, by means of ejector boost pumps comprising eductors 178, 179 and nozzles 180, 181, respectively. The eductor 178 is connected to one end of the transfer line 168. The nozzle 180 is connected into the same cross feed line 160 by means of the branch line 166, the same as the nozzle 164. The eductor 179 is connected to one end of the transfer line 167. The nozzle 181 is connected to the branch feedback line 165.

Basically then the port engine 35 draws fuel from the sumps 61 and 62. Sumps 61 and 62 are automatically continuously supplied with fuel from the auxiliary tanks 76, 77, 81 and 82. The auxiliary tanks 78, 79, and 80 are used to supply the sumps 61 and 62 only, and this occurs only when the valve 161 is opened. The fuel pressure in the port engine's main feed line 58 is increased when the feed line ejector pump 140 is put into operation by opening the valve 143. If necessary, the fuel supply to the port engine 35 can be shut off by simply closing the valve 57.

The starboard engine 36 draws its fuel from its main sump tank 43. The tank 43 is automatically continuously supplied with fuel from the tanks 71, 72 and 73. Ejector pumps in the auxiliary tanks 70, 71, 74 and 75 feed fuel to the sump 43 only when the valve 116 is open. The pressure in the starboard engine's main feed line 46 is boosted by the main feed line ejector pump when the valve 94 is open.

The tanks in the port and starboard wings 34 supply fuel to the lines 58 and 46 only when the valves 145 and 54 are opened. In case of fire, fuel to the engines 35 and 36 is cut off by closing fire valves 56 and 47.

Referring to FIG. 2, a subcombination or subsystem of the apparatus of FIG. 1 is illustrated. A two-stage pump is indicated generally by the reference numeral 540. The pump 540 has a centrifugal first stage and a constant displacement second stage. The pump 540 discharges fuel under pressure to an engine by way of a discharge line 541. The pump 540 draws fuel from a fuel tank 542 by means of an intake line 543. Pressure in the fuel line 543 is boosted by means of an ejector pump having an eductor 544 and a nozzle 545 positioned in the fuel tank 542. The eductor 544 is connected to an intake end of the fuel line 543. The nozzle 545 receives fuel under pressure from the first stage of the pump 540 by way of a feedback line 546. Pressure in the feedback line is boosted by an ejector pump comprising an eductor 547 and a nozzle 548. The eductor 547 is disposed in the feedback line 546. The nozzle 548 receives fuel under pressure from the discharge line 541 by way of a second feedback line 549.

In the embodiment of FIG. 2 the maximum pressure in the discharge line 541 is regulated by a one-way check valve 550 in a bypass line 551. The line 551, at its intake end, is connected to the second feedback line 549 and at its discharge end conducts excess fuel back into the first stage of the pump 540.

In FIG. 3, a two-stage pump is indicated generally by reference numeral 560. The pump 560 has a centrifugal first stage and a constant displacement second stage. The pump 560 discharges fuel to an engine by way of a discharge line 561. Fuel is drawn from a fuel tank 562 by the pump 560 through an intake line 563. Pressure in the line 563 is boosted by an ejector pump having an eductor 564 and a nozzle 565. The eductor 564 is connected to the intake end of the line 563. The nozzle 565 is supplied with fluid from the intake line 563 adjacent to the pump 560 by way of a feedback line 566. A second ejector pump comprising an eductor 567 and a nozzle 568 boosts the pressure in the feedback line 566. The eductor 567 is connected into the feedback line 566. Fuel is supplied to the nozzle 568 by way of a second feedback line 569 having its intake end connected to the pump discharge line 561. Excess pressure in the feedback line 569 can be relieved or boosted by an automatically operated pressure regulating valve 570 in a bypass line 571. The bypass line 571 is connected to the first stage of the pump 560 at one end thereof and into the line 569 at the other end thereof. The direction of flow in the bypass line 571 depends on whether or not the pressure in the line 569 will always be higher than the pressure in the first stage of the pump 560. The feedback fuel pressure at the nozzle 568 must be regulated so that the flow velocity at the nozzle 568 does not become sonic or supersonic, and is such that the nozzle 568 operates at maximum efficiency.

As previously pointed out, all of the eductors disposed within the various fuel tanks preferably face the bottom walls or floors thereof during normal aircraft attitude. Moreover the eductors are spaced an aptimum distance from the tank floors, depending upon the sizes of the eductors. Maximum fuel utilization from each tank can be assured by positioning each eductor in a suitable well in its tank floor.

It will be understood that this invention can be modified to adapt it to various circumstances and conditions, and it is accordingly desired to comprehend within the purview of this invention such modifications as may be considered to fall within the scope of the appended claims.

We claim:

1. A fuel feeding system for an aircraft engine comprising, a fuel tank, first ejector pump means having first eductor means with first nozzle means therein disposed in said fuel tank, a two-stage pump having an intake line and an outlet line, said pump being located externally of said fuel tank, said pump intake line being connected to said first eductor means, a first pressure boost feedback line having one end connecting the first stage of said pump to said first nozzle means for boosting the pressure in said pump intake line, second ejector pump means having second eductor means with second nozzle means therein and operatively disposed in said first pressure boost feedback line, a second pressure boost feedback line having an intake end connected into said pump outlet line and having another end thereof connected to said second nozzle means of said second ejector pump means.

2. A fuel feeding system as set forth in claim 1, further comprising, a pressure relief line having an intake end connected into said second pressure boost feedback line and having another end connected to discharge to the intake side of the second stage of said pump, and a one-way pressure relief valve in said pressure relief line for permitting passage of fuel into said pump only.

3. A fuel feeding system for an aircraft engine comprising, a fuel tank, first ejector pump means having first eductor means with first nozzle means therein disposed in said fuel tank, a pump having an intake line and an outlet line, said pump being located externally of said fuel tank, said pump intake line being connected to said first eductor means, a first pressure boost feedback line having an intake end connected into said pump intake line adjacent said pump and having another end connected to said first nozzle means, second ejector pump means having second eductor means with second nozzle means therein disposed in said first pressure boost feedback line, a second pressure boose feedback line having an intake end connected into said pump outlet line and having another end connected to said second nozzle means.

4. A fuel feeding system as set forth in claim 3, wherein said pump has a first stage and a second stage, and further comprising, a pressure relief line having an intake end connected into said second pressure boost feedback line and having another end connected to discharge to the intake side of the second stage of said pump, and a one-way pressure relief valve in said pressure relief line for permitting passage of fuel into said pump only.

References Cited by the Examiner
UNITED STATES PATENTS

| | | | |
|---|---|---|---|
| 1,350,095 | 8/1920 | Eddison | 103—42 |
| 1,930,064 | 10/1933 | Schmidt | 60—95 |
| 2,183,351 | 12/1939 | Narris | 103—5 |
| 2,660,232 | 11/1953 | Noon et al. | 103—5 |
| 2,688,925 | 9/1954 | Thoren et al. | 103—5 |
| 2,812,715 | 11/1957 | Redding et al. | 103—5 |
| 2,823,613 | 2/1957 | Leduc | 103—5 |
| 3,043,104 | 7/1962 | Magnus | 103—5 |
| 3,062,149 | 11/1962 | Jacuzzi | 103—5 |

DONLEY J. STOCKING, *Primary Examiner.*

W. J. KRAUSS, *Assistant Examiner.*